United States Patent [19]

Palm

[11] Patent Number: 5,609,311
[45] Date of Patent: Mar. 11, 1997

[54] COILING APPARATUS

[76] Inventor: James W. Palm, 340 Bastian Dr., Sugar Grove, Ill. 60554

[21] Appl. No.: 543,141

[22] Filed: Oct. 13, 1995

[51] Int. Cl.⁶ .................................................. B65H 75/36
[52] U.S. Cl. ........................................................ 242/405.1
[58] Field of Search ................................ 242/397, 397.1, 242/405, 405.1, 405.2, 405.3, 407; 254/134.3 FT

[56] References Cited

U.S. PATENT DOCUMENTS

| | | | |
|---|---|---|---|
| 2,689,709 | 9/1954 | Waldschmidt | 242/405.3 |
| 3,053,472 | 9/1962 | Stewart | 242/407 |
| 3,533,599 | 10/1970 | Hindenburg | 242/405.2 |
| 3,568,947 | 3/1971 | Oprins | 242/405.2 |
| 4,034,962 | 7/1977 | Thomsen . | |
| 5,052,660 | 10/1991 | Bergman . | |
| 5,056,731 | 10/1991 | Koehn | 242/405.3 |
| 5,149,056 | 9/1992 | Jones . | |
| 5,201,495 | 4/1993 | Crates et al. . | |
| 5,238,225 | 8/1993 | Hunt . | |
| 5,340,084 | 8/1994 | Crates et al. . | |
| 5,423,516 | 6/1995 | Blaha | 254/134.3 FT |

FOREIGN PATENT DOCUMENTS

| 19887 | 9/1915 | United Kingdom | 242/404.3 |

Primary Examiner—John P. Darling

[57] ABSTRACT

A coiling apparatus includes a storage tube assembly which includes a bottom portion, a top portion, and a pair of side wall portions connected between the bottom portion and the top portion. The coiling apparatus is used for storing a coil of long thin material such as electrical fish tape. The guide assembly is positioned along a mid-portion of the inside surface of the top portion of the storage tube assembly, and the guide assembly is used for guiding the electrical fish tape into the storage tube assembly for forming the coil. The top portion of the storage tube assembly is curved and has a top radius of curvature. The bottom portion of the storage tube assembly is curved and has a bottom radius of curvature. The top radius of curvature is greater than the bottom radius of curvature. The guide assembly includes a top guide portion which is coextensive with a portion of the top portion of the storage tube assembly. The guide assembly also includes a bottom guide portion, and guide walls are connected between the top guide portion and the bottom guide portion. The top guide portion is curved and has a guide top radius of curvature. The bottom guide portion is curved and has a guide bottom radius of curvature. The guide top radius of curvature is greater than the guide bottom radius of curvature.

6 Claims, 2 Drawing Sheets

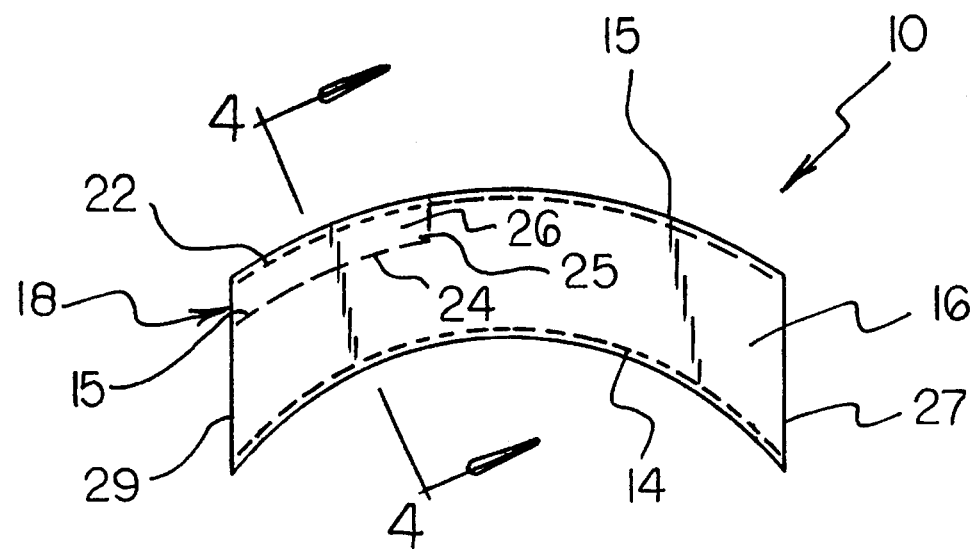
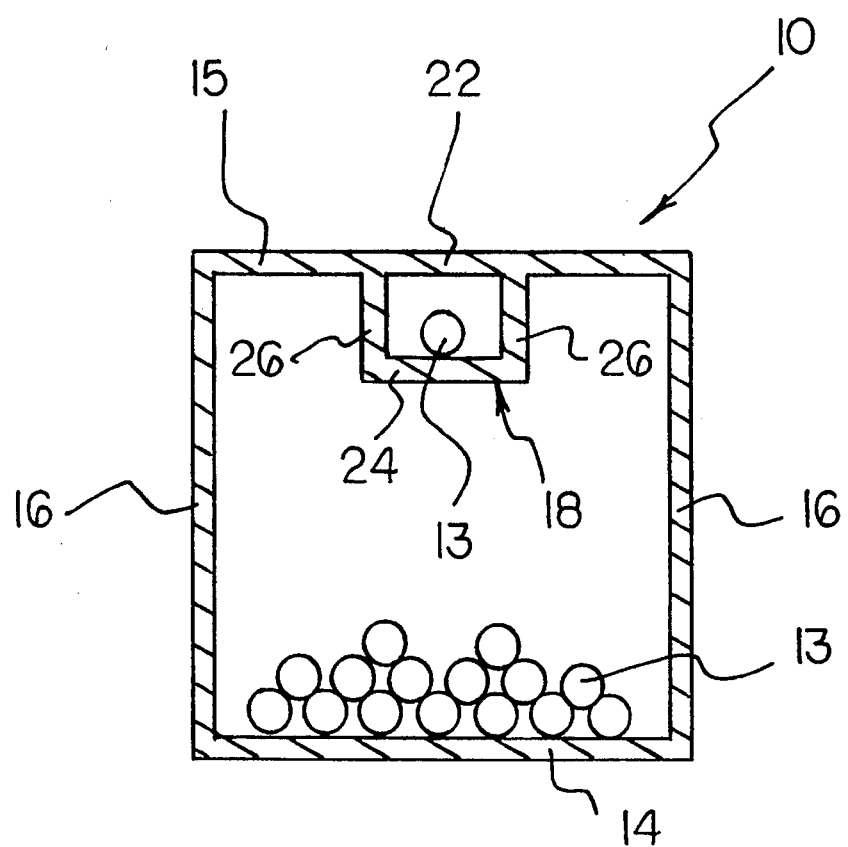

COILING APPARATUS

BACKGROUND OF THE INVENTION

1. Field of the Invention

The present invention relates generally to devices for retaining long thin materials such as wire, tubing, electrical fish tape and the like and, more particularly, to devices for retaining such long thin materials in coil form.

2. Description of the Prior Art

One type of long thin material that is of special interest is electrical fish tape. Electrical fish tape is long, thin, somewhat stiff material that is used push or pull relatively flaccid wire in hidden areas of a building such as behind walls and inside electrical conduits. A convenient way to retain such electrical fish tape when not in use and to pay out the electrical fish tape when it is being used is in reel or coil form. Throughout the years, a number of innovations have been developed relating to retaining electrical fish tape in reel or coil form, and the following U.S. Pat. Nos. are representative of some of those innovations: 4,034,962; 5,201,495; and 5,340,084. More specifically, each of U.S. Pat. Nos. 4,034,962, 5,201,495, and 5,340,084 discloses a fish tape reel that has a fully circular and fully enclosed storage chamber which has a predetermined and fixed volume.

The fully circular nature of the prior art fish tape reels requires a coil of electrical fish tape (or long thin materials more generally) to be retained in a relatively neat arrangement. In actuality, it may be particularly burdensome to retain a quantity of long thin materials in a relatively neat arrangement. In this respect, it would be desirable if a coil retaining device were provided which does not employ a coil-retaining chamber that is fully circular.

The fully enclosed storage chambers of the prior art fish tape reels which have predetermined and fixed storage volumes pose a severe limit as to the volume of electrical fish tape (or long thin materials generally) that can be stored. In this respect, it would be desirable if a coil retaining device were provided which does not employ a fully enclosed storage, chamber that has a predetermined and fixed storage volume.

Another disadvantage of fully enclosed storage chambers for long thin materials is that if the materials are wet or dirty, they are difficult to clean and dry when stored in a fully enclosed storage chamber. In this respect, it would be desirable if a coil retaining device were provided readily permits a stored coil to be cleaned and dried.

In addition, the following U.S. patents may also be of interest. U.S. Pat. No. 5,052,660 discloses an electrical wire threading apparatus that employs a plurality of fiberglass rod sections. U.S. Pat. No. 5,149,056 discloses and hand-drill-operated wire puller for electrical conduits. U.S. Pat. No. 5,238,225 discloses a method and apparatus for pulling underground electrical cable.

Still other features would be desirable in a coiling apparatus. Although a fully circular storage device for a coil is not desirable as discussed above, to assist in the formation of a coil of long thin materials and to help retain the long thin materials in coil form, it would be desirable if a coil retaining device were partially circular. In addition, to help form a coil on a coil retaining device, it would be desirable if a coil retaining device included a provision for guiding long thin materials in their movement in the coil retaining device. In addition, for purposes of simplicity of operation and ease of manufacture, it would be desirable if a coil retaining device were provided which does not include any moving parts. This would be in sharp contrast to the prior art fish tape reels discussed above.

Thus, while the foregoing body of prior art indicates it to be well known to use coil retaining devices, the prior art described bed above does not teach or suggest a coiling apparatus which has the following combination of desirable features: (1) does not employ a coil-retaining chamber that is fully circular; (2) does not employ a fully enclosed storage chamber that has a predetermined and fixed storage volume; (3) readily permits a stored coil to be cleaned and dried; (4) is partially circular; (5) has a provision for guiding long thin materials in their movement in the coiling apparatus; and (6) does not include any moving parts. The foregoing desired characteristics are provided by the unique coiling apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a coiling apparatus which includes a storage tube assembly which includes a bottom portion, a top portion, and a pair of side wall portions connected between the bottom portion and the top portion. A guide assembly is connected to an inside surface of the storage tube assembly. The guide assembly is positioned along a mid-portion of the top portion of the storage tube assembly. The storage tube assembly has a rectangular transverse cross section, and the guide assembly also has a rectangular transverse cross section. The top portion of the storage tube assembly is curved and has a top radius of curvature. The bottom portion of the storage tube assembly is curved and has a bottom radius of curvature. The top radius of curvature is greater than the bottom radius of curvature.

The guide assembly includes a top guide portion which is coextensive with a portion of the top portion of the storage tube assembly. The guide assembly also includes a bottom guide portion, and guide walls are connected between the top guide portion and the bottom guide portion. The top guide portion is curved and has a guide top radius of curvature. The bottom guide portion is curved and has a guide bottom radius of curvature. The guide top radius of curvature is greater than the guide bottom radius of curvature.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved coiling apparatus which has all of the advantages of the prior art and none of the disadvantages.

It is another object of the present invention to provide a new and improved coiling apparatus which may be easily and efficiently manufactured and marketed.

It is a further object of the present invention to provide a new and improved coiling apparatus which is of durable and reliable construction.

An even further object of the present invention is to provide a new and improved coiling apparatus which is susceptible of a low cost of manufacture with regard to both materials and labor, and which accordingly is then susceptible of low prices of sale to the consuming public, thereby making such coiling apparatus available to the buying public.

Still yet a further object of the present invention is to provide a new and improved coiling apparatus which does not employ a coil-retaining chamber that is fully circular.

Still another object of the present invention is to provide a new and improved coiling apparatus that does not employ a fully enclosed storage chamber that has a predetermined and fixed storage volume.

Yet another object of the present invention is to provide a new and improved coiling apparatus which readily permits a stored coil to be cleaned and dried.

Even another object of the present invention is to provide a new and improved coiling apparatus that is partially circular.

Still a further object of the present invention is to provide a new and improved coiling apparatus which has a provision for guiding long thin materials in their movement in the coiling apparatus.

Yet another object of the present invention is to provide a new and improved coiling apparatus that does not include any moving parts.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a side view of the embodiment of the coiling apparatus of FIGS. 1 and 2 with the electrical fish tape removed.

FIG. 4 is an enlarged cross-sectional view of the embodiment of the invention shown in FIG. 3 taken along line 4—4 thereof and also showing a quantity of electrical fish tape being guided and stored in the coiling apparatus.

DESCRIPTION OF THE PREFERRED EMBODIMENT

Figure 1:
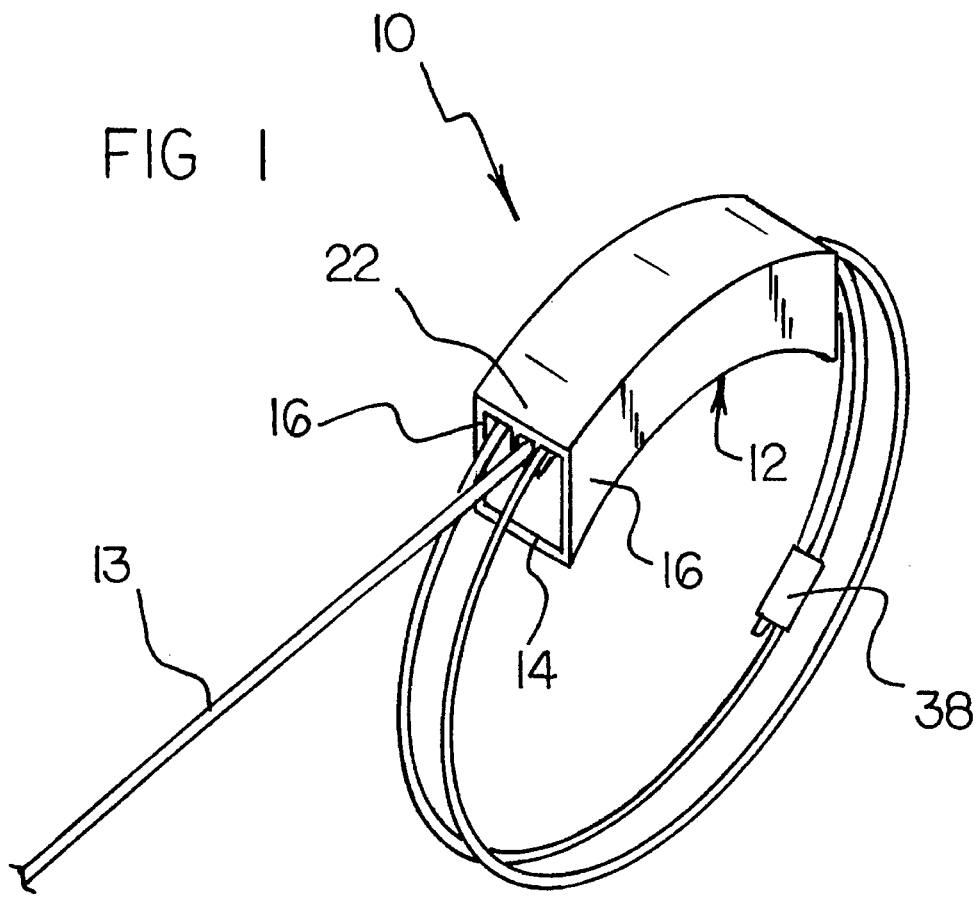
FIG. 1 is a perspective view showing a preferred embodiment of the coiling apparatus of the invention with only a relatively small amount of electrical fish tape stored in the apparatus.

With reference to the drawings, a new and improved coiling apparatus embodying the principles and concepts of the present invention will be described.

Turning to FIGS. 1–4, there is shown an exemplary embodiment of the coiling apparatus of the invention generally designated by reference numeral 10. In its preferred form, coiling apparatus 10 includes a storage tube assembly 12 which includes a bottom portion 14, a top portion 15, and a pair of side wall portions 16 connected between the bottom portion 14 and the top portion 15. A guide assembly 18 is connected to an inside surface of the storage tube assembly 12. The guide assembly 18 is positioned along a mid-portion of the top portion 15 of the storage tube assembly 12. The storage tube assembly 12 has a rectangular transverse cross section, and the guide assembly 18 also has a rectangular transverse cross section. The top portion 15 of the storage tube assembly 12 is curved and has a top radius of curvature. The bottom portion 14 of the storage tube assembly 12 is curved and has a bottom radius of curvature. The top radius of curvature is greater than the bottom radius of curvature.

The guide assembly 18 includes a top guide portion 22 which is coextensive with a portion of the top portion 15 of the storage tube assembly 12. The guide assembly 18 also includes a bottom guide portion 24, and guide walls 26 are connected between the top guide portion 22 and the bottom guide portion 24. The top guide portion 22 is curved and has a guide top radius of curvature. The bottom guide portion 24 is curved and has a guide bottom radius of curvature. The guide top radius of curvature is greater than the guide bottom radius of curvature.

As is clear in the drawings, the overall aspect of the storage tube assembly 12 is a curved tube. Similarly, the overall aspect of the guide assembly 18 is a smaller and shorter curved tube.

In using the coiling apparatus 10 of the invention, a coil 30 of a long thin material, e.g. electrical fish tape 13, is formed on the coiling apparatus 10. To do this, a first free end of the electrical fish tape 13 is threaded through the guide assembly 18, from the front end 15 to the rear end 25 of the guide assembly 18. Then, a portion of the electrical fish tape 13 is passed out of a rear end 27 of the storage tube assembly 12 and returned to a front end 29 of the storage tube assembly 12. More of the electrical fish tape 13 is fed through the guide assembly 18, out the rear end 27 of the storage tube assembly 12, and into the front end 29 of the storage tube assembly 12 and through the storage tube assembly 12 so that more of the electrical fish tape 13 passes out of the rear end 27 of the storage tube assembly 12 after having passed completely through the storage tube assembly 12. As more and more of the electrical fish tape 13 follows the above-described path, the electrical fish tape 13 forms a plurality of loops of electrical fish tape 13. A clip 38 can be used to fix the first free end of the electrical fish tape 13 to a first loop of the electrical fish tape 13. The plurality of loops form a coil 30 of electrical fish tape 13.

Figure 2:
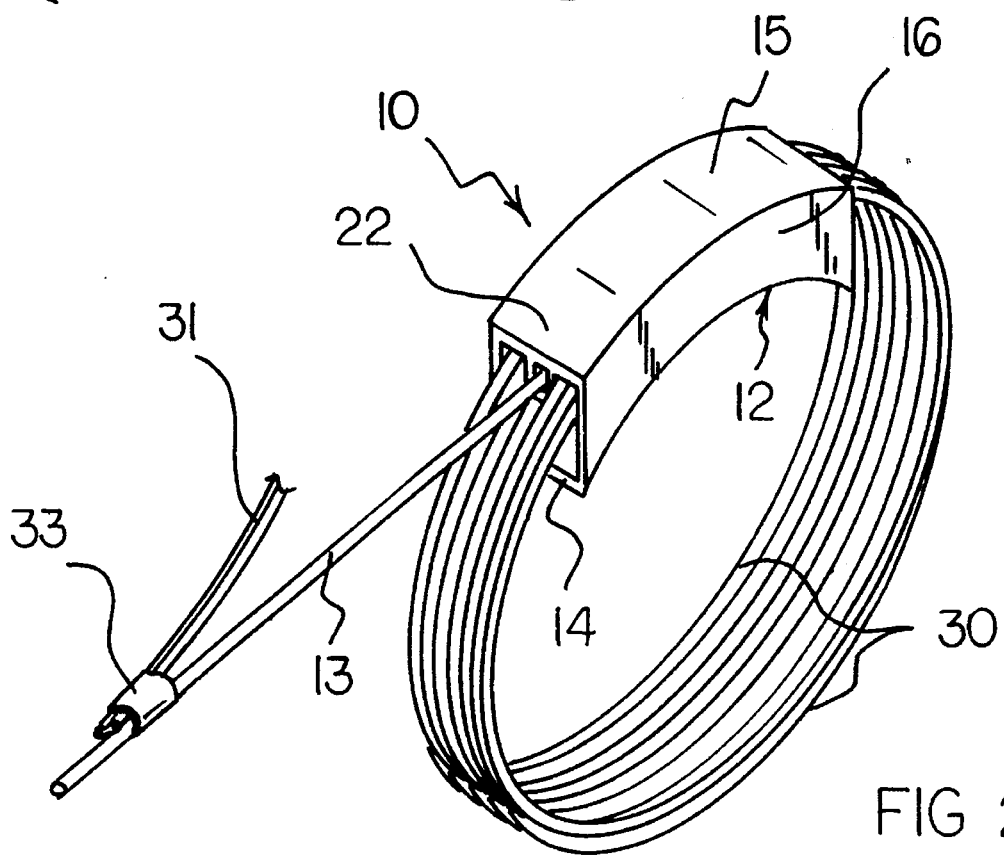
FIG. 2 is perspective view of the embodiment of the coiling apparatus shown in FIG. 1 with a relatively large amount of electrical fish tape stored in the apparatus and with a free end of the electrical fish tape connected to a free end of a wire.

As shown in FIG. 2, to use the coil 30 of electrical fish tape 13 to guide a wire 31 to a desired location, a free end of the wire 31 is attached to a portion of the electrical fish tape 13. A clip 33 can be used to temporarily attach the wire 31 to the electrical fish tape 13. Then, the electrical fish tape 13 is payed out of the guide assembly 18 in the reverse direction from which it was fed into the storage tube assembly 12 to form the coil 30. As more and more of the electrical fish tape 13 is payed out of the coiling apparatus 10, the coil 30 of electrical fish tape 13 uncoils. After the electrical fish tape 13 has been moved to the desired location, the dip 33 is removed, the wire 31 is separated from the electrical fish tape 13, and the electrical fish tape 13 can be rewound onto the coil 30. The guide assembly 18 helps form neat and regular coils 30 of the long thin materials. Moreover, the guide assembly 18 aids in paying out long thin materials from the coil 30 in a smooth and efficient manner.

In addition, the coiling apparatus 10 can be used for carrying a coil 30 of long thin materials. One simply grasps the storage tube assembly 12 which readily serves as a handle for carrying the coil 30. If the coil 30 is wet, the open nature of the coiling apparatus 10 permits most of the coil 30 to be uncovered and exposed to the air. Moreover, the tubular nature of the storage tube assembly 12 and the guide assembly 18 permits air to be exposed to the portion of the coil 30 retained with the storage tube assembly 12 and the guide assembly 18.

The components of the coiling apparatus of the invention can be made from inexpensive and durable metal or plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved coiling apparatus that is low in cost, relatively simple in design and operation, and which may advantageously be used without employing a coil-retaining chamber that is fully circular. With the invention, a coiling apparatus is provided which does not employ a fully enclosed storage chamber that has a predetermined and fixed storage volume. With the invention, a coiling apparatus is provided which readily permits a stored coil to be cleaned and dried. With the invention, a coiling apparatus is provided which is partially circular. With the invention, a coiling apparatus is provided which has a provision for guiding long thin materials in their movement in the coiling apparatus. With the invention, a coiling apparatus is provided which does not include any moving parts.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A coiling apparatus, comprising:

a storage tube assembly which includes a bottom portion, a top portion, and a pair of side wall portions connected between said bottom portion and said top portion, and a guide assembly connected to an inside surface of said storage tube assembly, wherein said guide assembly is positioned along a midportion of said top portion of said storage tube assembly.

2. The apparatus of claim 1 wherein said storage tube assembly has a rectangular transverse cross section.

3. The apparatus of claim 1 wherein said guide assembly has a rectangular transverse cross section.

4. The apparatus of claim 1 wherein:

said top portion of said storage tube assembly is curved and has a top radius of curvature, said bottom portion of said storage tube assembly is curved and has a bottom radius of curvature, and said top radius of curvature is greater than said bottom radius of curvature.

5. A coiling apparatus, comprising:

a storage tube assembly which includes a bottom portion, a top portion, and a pair of side wall portions connected between said bottom portion and said top portion, and a guide assembly connected to an inside surface of said storage tube assembly, wherein said guide assembly includes:
a top guide portion which is coextensive with a portion of said top portion of said storage tube assembly,
a bottom guide portion, and
guide walls connected between said top guide portion and said bottom guide portion.

6. The apparatus of claim 5 wherein:

said top guide portion is curved and has a guide top radius of curvature, said bottom guide portion is curved and has a guide bottom radius of curvature, and said guide top radius of curvature is greater than said guide bottom radius of curvature.

\* \* \* \* \*